May 26, 1931.  C. OSAKO  1,807,130
CATTLE GUARD
Filed July 22, 1930   2 Sheets-Sheet 1
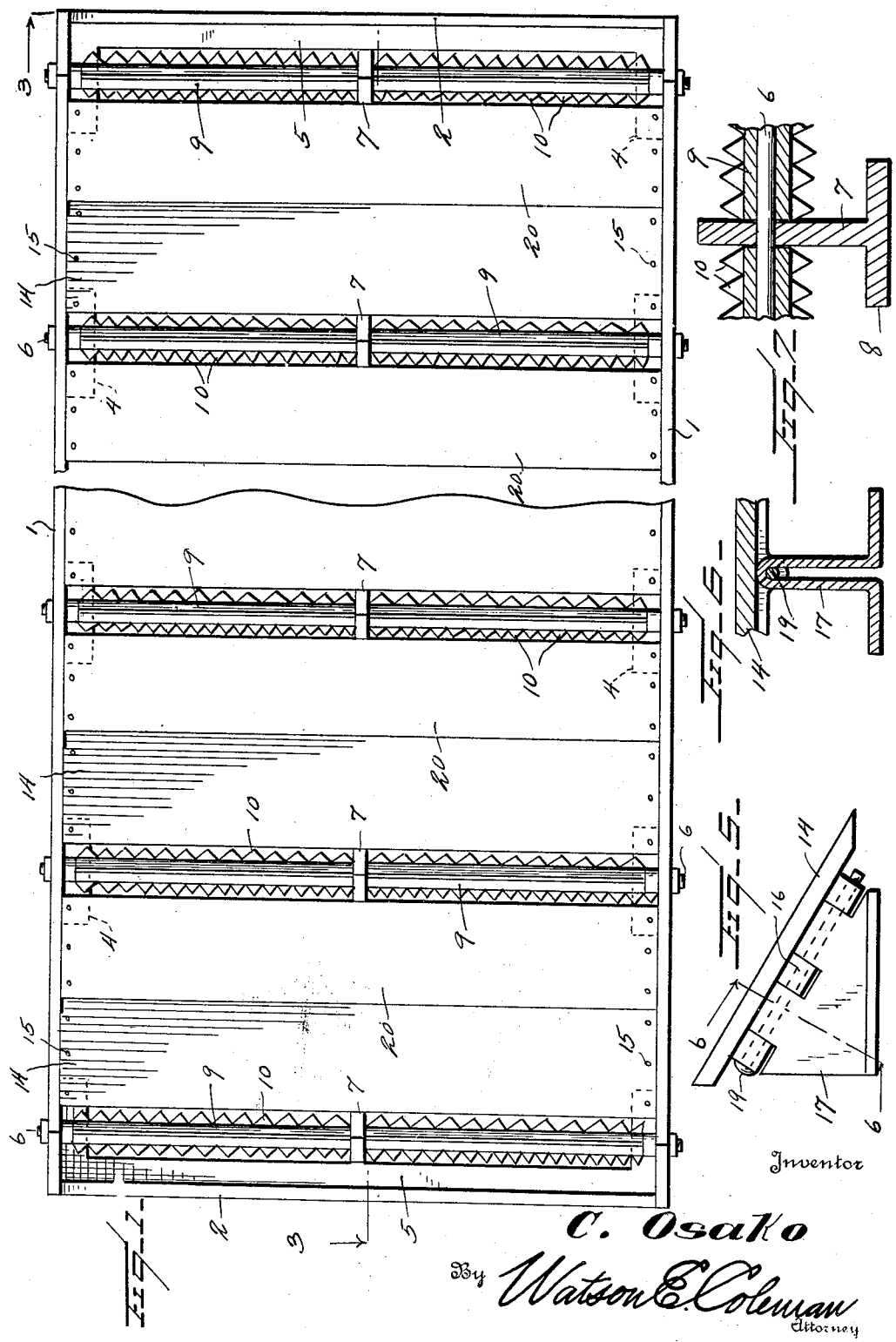
Inventor
C. Osako
By Watson E. Coleman
Attorney

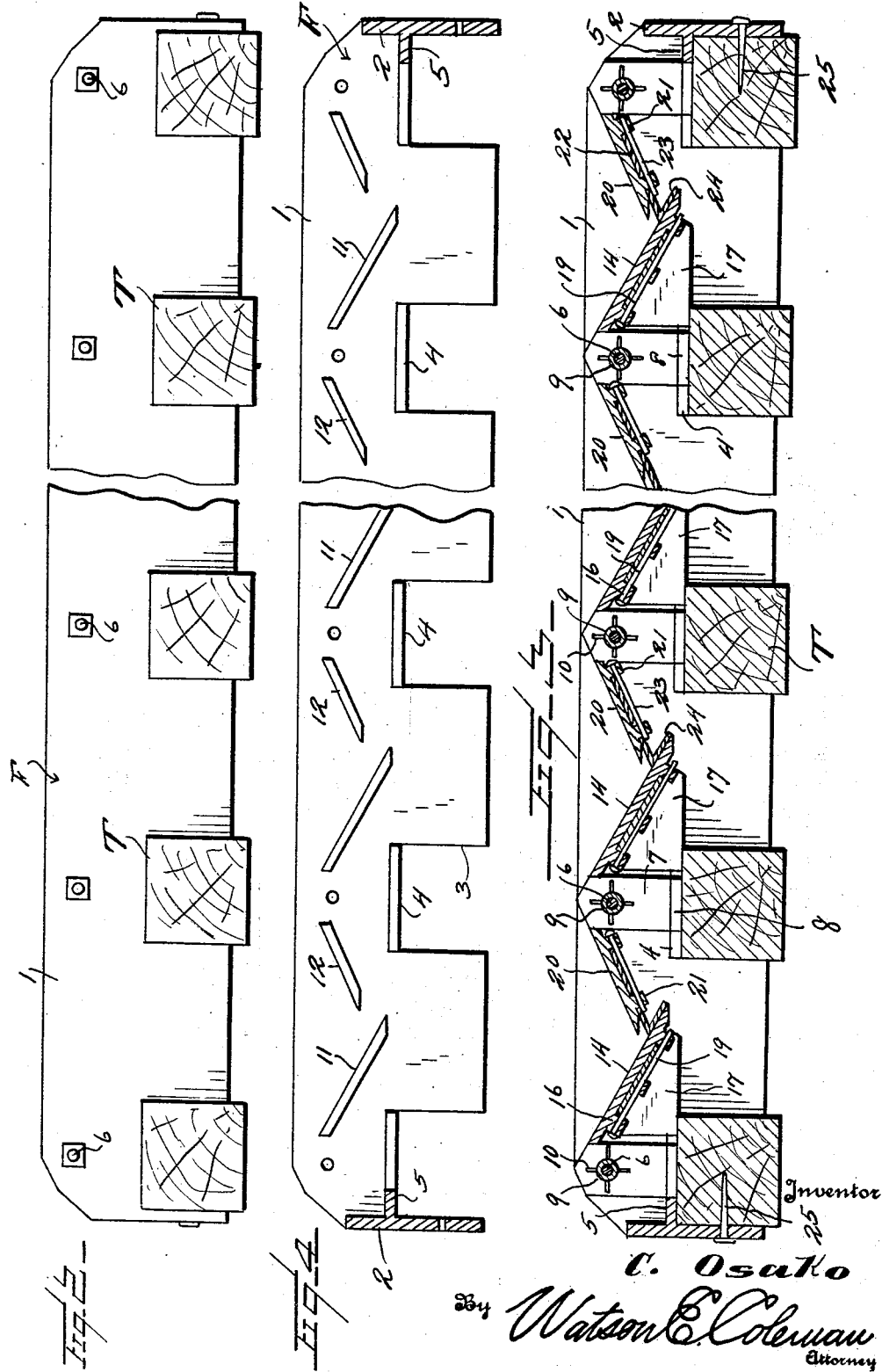

Patented May 26, 1931

1,807,130

UNITED STATES PATENT OFFICE

CLEOTRA OSAKO, OF WORLAND, WYOMING

CATTLE GUARD

Application filed July 22, 1930. Serial No. 469,863.

This invention relates to a cattle guard, and it is an object of the invention to provide a device of this kind which can be applied in working position as a unit and wherein the guard is so constructed as to be properly positioned upon a trackway without cutting or otherwise weakening the cross ties.

The invention also has for an object to provide a device of this kind which can be quickly and effectively anchored or secured in applied position and which in its construction comprises a plurality of rotatable members adapted to turn when the weight of an animal is placed thereon to provide a means for checking the animal against further travel along a trackway.

Another object of the invention is to provide a device of this kind which comprises a plurality of pairs of sliding surfaces, the surfaces of each pair being inclined one toward the other, said inclined surfaces further hampering or interfering with the travel of an animal.

The invention consists in the details of construction and in the combination and arrangement of the several parts of my improved cattle guard whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:—

Figure 1 is a view in top plan of a cattle guard constructed in accordance with an embodiment of my invention;

Figure 2 is a view in side elevation of the guard as illustrated in Figure 1 in applied position;

Figure 3 is a sectional view taken substantially on the line 3—3 of Figure 1;

Figure 4 is a view in longitudinal section taken through the frame of the guard with the various plates and rotating sleeves removed;

Figure 5 is a view in elevation of one of the inclined surfaces or plates and the brace member associated therewith;

Figure 6 is a detailed sectional view taken substantially on the line 6—6 of Figure 5;

Figure 7 is a fragmentary sectional view illustrating the mountings for adjacent sleeves and the brace member associated therewith.

As herein disclosed, my improved guard comprises a frame F which constitutes a unit consisting of side plates 1 and end plates 2. Each of the side plates 1 has its lower portion provided with cut-out portions 3 to snugly receive end portions of the cross ties T. The upper edges of the cut-out portions 3 are defined by the inwardly disposed flanges 4 adapted to rest from above upon the ties T.

The end plates 2 are also provided with the inwardly disposed flanges 5 resting from above upon the ties T. As clearly illustrated in the accompanying drawings the flanges 5 are coplanar with the flanges 4.

The side plates 1 above the cut-out portions 3 are tied or connected by the rods 6 and the central portion of each of these rods 6 is supported or braced by the post 7. The post 7 has a base 8 resting from above upon a tie T while the upper portion of the post 7 is pointed, as at 9. Mounted upon each of the rods 6 at opposite sides of the post 7 are the sleeves 9, said sleeves substantially bridging the spaces between the posts 7 and side plates 1. The sleeves 9 have substantially radiating therefrom the teeth 10.

The inner face of each of the side plates 1 of the frame F between adjacent rods 6 is provided with a pair of downwardly converging flanges 11 and 12, the flange 11 having its lower portion terminating below the flange 12 and spaced therefrom. The flanges 11 provide supports for the end portions of the downwardly inclined pates 14 bridging the space between the side plates 1, said end portions of the plates 14 being riveted, as at 15, or otherwise anchored to the flanges 11. The central portion of each of the plates 14 is provided at substantially its longitudinal center with a plurality of transversely aligned depending knuckles 16 which interlock or mesh with the upper portion of a bracing member 17, said member 17 and knuckles 16 being connected by a headed pin 19 or the like. Each of the bracing members 17 has its inner portion contacting from above with a tie T.

The flanges 12 of the side members 1 provide supports for the end portions of a second plate 20 bridging the space between said side members 1 and which plate is inclined downwardly toward the lower portion of the adjacent applied plate 14 but terminating a slight distance therefrom. This plate 20 at substantially its longitudinal center is provided with transversely aligned knuckles 21 which are disposed through a bracing plate 22, the plate 22 being held in applied position with respect to the plate 20 by a pin 23 directed through the knuckles 21 below the plate 22. The lower portion of the plate 22 is provided with a reverted flange 24 which has close contact with the lower portion of an adjacent plate 14 whereby the central part of the plate 20 is effectively braced or reinforced.

The cattle guard, as herein disclosed, can be readily and quickly placed in position as a unit and when applied the lower portions of the end members 2 overlie and have close contact with side faces of certain of the ties T. These end members 2 are secured to said ties by the spikes 25 or otherwise as may be preferred.

It is to be understood that the various parts of the guard as herein disclosed are preferably made of metal.

With the improved guard in applied position an animal endeavoring to pass thereover first comes into contact with the teeth 10 of a sleeve 9 and ordinarily the resultant pain will check the animal, but if he should pass over an end sleeve and step upon a plate 14 or 20 he will slide downwardly of such plate in a manner to cause him to tumble with considerable force. These various operations occur generally with the fore legs and before the animal steps with its hind legs upon the guard.

It is to be particularly noted that the construction of my guard is such that it can be quickly placed in position and that it is of a character to effectively protect the trackway against trespass by cattle.

From the foregoing description it is thought to be obvious that a cattle guard constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:—

1. A cattle guard comprising a frame adapted to be placed upon the ties of a trackway and having side members, plates supported by and bridging the space between the side members of the frame, said plates being arranged in pairs with the plates of each pair inclined one toward the other, and rotatable sleeves supported by the frame and positioned between adjacent pairs of plates, said rotatable members having outstanding teeth.

2. A cattle guard comprising a frame adapted to be placed upon the ties of a trackway and having side members, plates supported by and bridging the space between the side members of the frame, said plates being arranged in pairs with the plates of each pair inclined one toward the other, and rotatable sleeves supported by the frame and positioned between adjacent pairs of plates.

3. A cattle guard comprising a frame adapted to be placed upon the ties of a trackway and having side members, plates supported by and bridging the space between the side members of the frame, said plates being arranged in pairs with the plates of each pair inclined one toward the other, and rotatable sleeves supported by the frame and positioned between adjacent pairs of plates, one of the plates of each pair terminating above and inwardly of the second plate.

4. A cattle guard comprising a frame adapted to be placed upon the ties of a trackway and having side members, plates supported by and bridging the space between the side members of the frame, said plates being arranged in pairs with the plates of each pair inclined one toward the other, rotatable sleeve supported by the frame and positioned between adjacent pairs of plates, one of the plates of each pair terminating above and inwardly of the second plate, and a bracing member for each pair of plates interposed between said plates and directly engaged therewith.

In testimony whereof I hereunto affix my signature.

CLEOTRA OSAKO.